L. G. POND.
CARBURETER.
APPLICATION FILED APR. 7, 1913.
1,096,750.
Patented May 12, 1914.
2 SHEETS—SHEET 1.
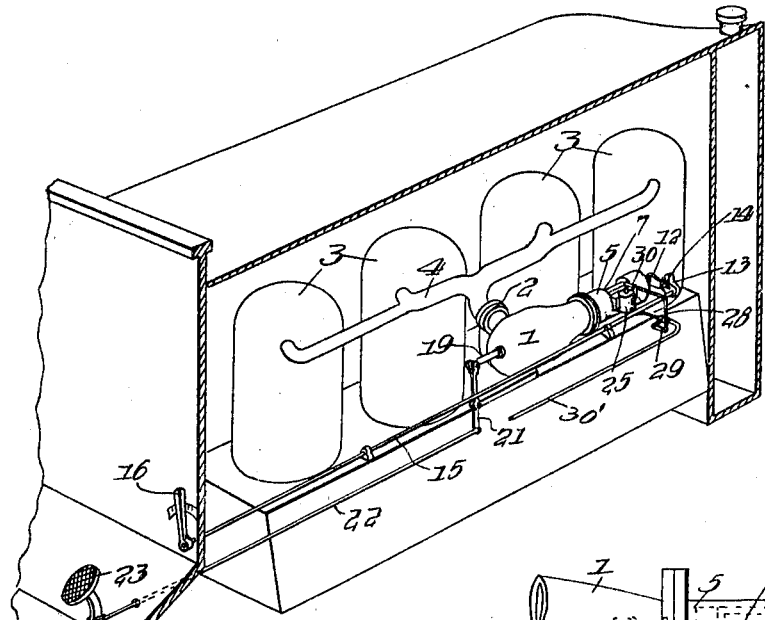
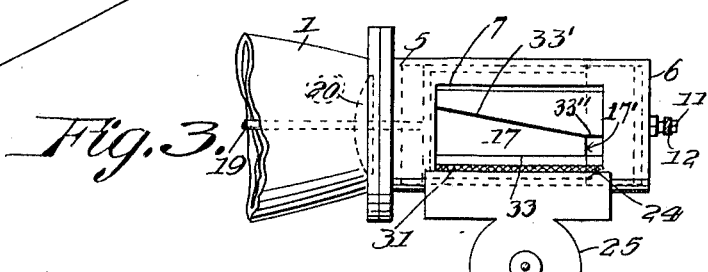
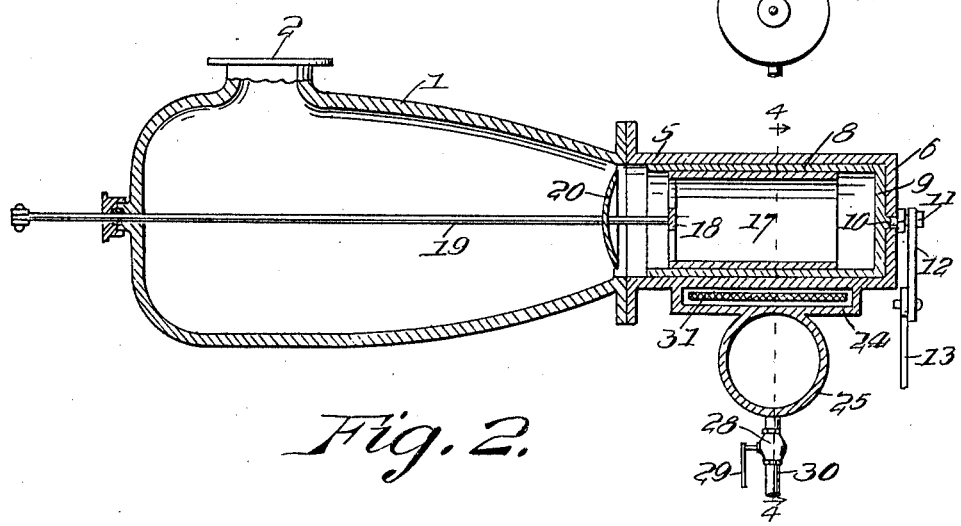
Inventor
Lester G. Pond

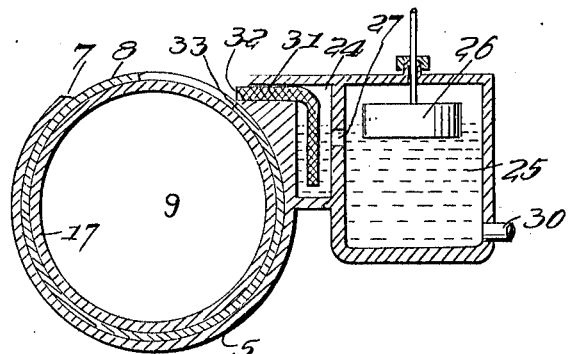
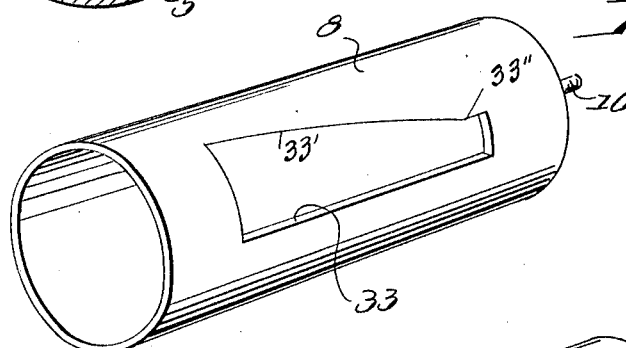
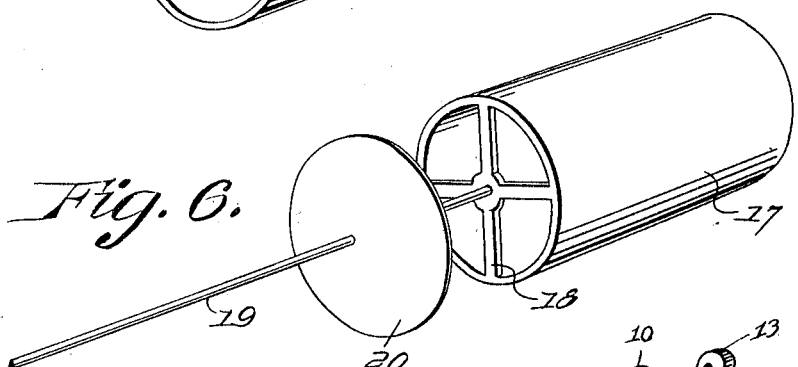
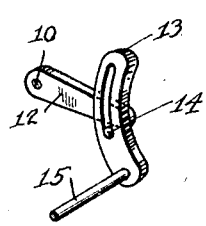

UNITED STATES PATENT OFFICE.

LESTER G. POND, OF SEEKONK, MASSACHUSETTS, ASSIGNOR TO THEODORE W. FOSTER, OF PROVIDENCE, RHODE ISLAND.

CARBURETER.

1,096,750.  Specification of Letters Patent.  Patented May 12, 1914.

Application filed April 7, 1913. Serial No. 759,277.

*To all whom it may concern:*

Be it known that I, LESTER G. POND, a citizen of the United States, residing at Seekonk, in the county of Bristol and State of Massachusetts, have invented a new and useful Improvement in Carbureters, of which the following is a specification.

This invention relates to certain new and useful improvements in carbureters, and the primary object thereof is to provide a device of this type which has novel and improved means for accurately controlling the richness of the combustible mixture.

A further object of the invention is to provide a carbureter which has a gasolene saturated wick, or the like, and means for controlling the entry of air, after contact with the wick, into the mixing chamber, which means has a diagonal relationship to the wick, so that the richness of the mixture may be controlled in varying degrees.

In the drawings—Figure 1 is a perspective view of the invention applied in position on an automobile, the latter being shown in fragmentary section. Fig. 2 is a central horizontal section of the invention. Fig. 3 is a fragmentary top plan view of the front of the apparatus. Fig. 4 is a section on the line 4—4 of Fig. 2. Fig. 5 is a detail perspective view of the controlling valve for the air, and Fig. 6 is a similar view of the air controlling slide. Fig. 7, is a fragmentary detail perspective view of a part of the means for rocking the air admission valve.

The invention embodies a mixing chamber 1 that has an outlet 2 which connects with the cylinders 3 by means of the manifold pipe connections 4. Attached to one end of the chamber 1 is a casing 5 that has a closed end 6, the upper portion of the casing being cut away at 7. Rotatably mounted in the casing 5 is a tubular or hollow cylindrical air controlling valve 8 which latter has a closed end 9 that abuts the closed end 6 of the casing 5, the end 9 having a threaded stem 10 which extends through the end 6 of casing 5 and has a cranked outer end 11 which is connected by means of a link 12 to an oscillatory member 13. The member 13 and link 12 have a pin and slot connection 14, and a rod 15 has the member 13 rigidly connected thereto, whereby rotary movement imparted to the rod, by means, for instance of a handle 16, will effect corresponding rotation of the valve 8. The means described for rotating the valve 8 is shown merely by way of example, since other approved or desired means may be readily substituted. Mounted on the interior of the valve 8 is a tubular open ended slide 17, which is of less length than the valve 8 and at its inner end has a spider 18 to which a rod 19 is rigidly connected. A dished baffle plate 20 is rigidly mounted on the rod 19 and is located in spaced relation to the inner end of the slide 17, the outer end of the rod 19 extending through the rear end of the chamber 1 and being connected to a pivoted lever 21 which latter is connected to a rod 22. The rod 22 is operated by a foot pedal 23 to move the slide 17 along the length of the valve 8. Means other than that just described may be used to operate or manipulate the slide 17, since the means herein disclosed, like the means for rotating the valve 8, is merely shown by way of example.

Carried by the casing 5 is a wick chamber 24 which in turn is connected to a gasolene chamber 25 in which is a float 26, a port 27 between the chambers 24 and 25 enabling gasolene to enter the former from the latter. The float controls the quality of gasolene admitted to the chamber 25 through a valve 28 by any suitable means, for example a bell crank lever 29 connected to the valve and a horizontal lever 30 that is pivoted to the chamber 25 and to the lever 29, the valve 28 being located in a pipe 30′ which leads from the source of supply.

A wick 31 has its lower end submerged in the gasolene in the wick chamber 24 and has its upper end disposed at right angles to its lower end, so as to present a vertical edge 32 into a slot 33 that is formed in the valve 8. The wick becomes saturated with the gasolene, and the air that contacts therewith is drawn by suction through the slot 33 of the valve 8 and thence into the interior of the hollow slide 17, at the end 17′ thereof (Fig. 3) whence the air passes through the interior of the hollow slide 17, past the web 18 thereof and against the baffle 20, which latter throws the mixture rearwardly of its direction of travel and against the walls of the chamber 1 that surrounds the baffle, thereby causing thorough mixing of and intimacy between the air and gasolene, prior to exhaust of the resultant mixture through the outlet 2.

In order to govern the richness of the mixture, the valve 8 may be turned so as to cover or uncover more or less of the slot 33, thereby controlling the amount of air that is permitted to enter the chamber 1. By moving the slide 17 toward the rear end of the body 1 the end 17' of the slide will uncover the slot 33 at the front end of the latter to allow a greater quantity of air to enter the slide, and by such movement of the slide, the baffle will be correspondingly moved toward the rear of the body, thus allowing the richness of the mixture to be controlled or governed, as desired.

An important feature of the present invention is the shape of the slot 33, namely having a diagonal or inclined wall 33', which latter at the front end of the valve 8 terminates in a comparatively short wall 33'', the latter being disposed parallel to the other side wall of the slot, said last named side wall of the slot being parallel to the longitudinal axis of the valve. By referring to Fig. 3 of the drawings, it will therefore be seen that the wall 33'' has a diagonal relationship to the vertical edge 32 of the wick, and by rotating the valve 8 it will be seen that a wedge shaped space for the air that enters the slide 17 will be provided. This wedge shaped space is an advantage in that the strata of air which is at the widest part of the slot or wedge-shaped space will not come in contact with the gasolene that is held by the wick, which further allows the richness of the mixture to be varied. When the slide 17 is moved so that its end 17' is at the inner edge of the wall 33'' of the slot, it will be seen that the entrance to the slide is a substantially rectangular one, and that when the slide 17 is moved toward the chamber 1 the entrance into the slide will be of wedge-shape, thus allowing further variations in the richness of the mixture to be obtained.

From the above it will be noted that the air is drawn over the wick, and then enters the space between the wick, the end 17' of the slide 17, and the slot 33, from whence the mixture passes through the slide and contacts with the baffle and then egresses through the outlet 2 and manifold 4 to the cylinders 3.

Having thus described my invention, I claim as new and desire to secure by Letters Patent:—

1. In combination with a carbureting chamber, a wick having a longitudinal edge disposed parallel to the longitudinal axis of the chamber, a casing adjacent the chamber having a slot, the edge of the wick being located adjacent to said slot, a valve having a slot rotatably mounted in the casing, a slide of tubular open ended construction mounted in the valve, a baffle movable with the slide and located at the rear end of the slide, and means to operate the slide.

2. In combination with a wick, a slide of tubular open-ended form, a hollow rockable valve having a slot, the valve being arranged to surround the slide, and having its slot disposed adjacent to the wick, and means to operate the slide.

3. In combination with a carbureting chamber, a wick, means to maintain the wick saturated with gasolene and means whereby air after contacting with the wick may enter the chamber, said means forming a wedge-like entry for the air in conjunction with the wick.

4. In combination with a carbureting chamber, and a wick arranged adjacent to the chamber to present a continuous uninterrupted edge, means to establish communication between the wick and chamber to allow air, after contacting with the wick to enter the chamber, and means to control said communication to provide a wedge-like space in conjunction with the wick.

5. In combination with a carbureting chamber, a hollow slide, a wick arranged adjacent to the chamber and exteriorly of the chamber, said slide affording means of communication with the chamber from the air, and means coöperating with the slide to govern the quantity of air that enters the slide.

6. In combination with a carbureting chamber, and a wick disposed in proximity thereto, means to establish communication for the air from the wick to the chamber, and means to adjust the size of said communication, the adjusting means having a part thereof which is diagonally related to the wick to provide a wedge-shape space in conjunction with the wick.

7. In combination with a carbureting chamber, and a wick disposed adjacent thereto, means to establish communication between the wick and chamber, and means to control said communication having a movable part which is presented in diagonal relation to the wick.

8. In combination with a wick arranged to present a longitudinal continuous uninterrupted edge, a rotary member having a peripheral slot, one of the longitudinal walls formed by the slot confronting said wick edge, and means movable transversely of said wick edge and wall to vary the size of the opening formed between said wick edge and wall.

9. In combination with a wick arranged to present a longitudinal continuous uninterrupted edge, a rotary valve having a peripheral slot, one of the longitudinal walls formed by the slot confronting the wick edge, and a longitudinally movable slide having an end thereof extending transversely of the wick edge and said wall to vary the size of the opening formed between said wick edge and wall.

10. In combination with a continuous uninterrupted wick edge, and means to maintain said edge saturated with gasolene, a member having an edge which confronts the wick edge in spaced relation to the latter, and means to vary the size of the space between said edges.

11. In a carbureter, a carbureting chamber, a wick, means to inclose the wick so as to expose a continuous uninterrupted edge thereof, and rotary means peripherally slotted coöperating with said wick edge to govern the amount of air which latter after contacting with the wick enters said chamber.

12. In a carbureter, a wick arranged to present a substantially continuous uninterrupted edge portion thereof to the atmosphere, means to maintain said wick edge saturated with gasolene, a carbureting chamber adjacent to the wick, and in communication with the latter, and means to control said communication so as to regulate the extent of said portion of the wick which communicates with the carbureting chamber.

13. In combination with a carbureting chamber, and a source of gasolene supply, a pair of telescopic elements between the chamber and supply, one of said elements having a peripheral slot, a wick adjacent the slot, said elements being hollow so as to conduct the air and gasolene to the chamber, and means to adjust said elements to vary the length and width of said slot whereby the same may control the amount of air and gasolene that enters the chamber.

14. In combination with a carbureting chamber, and a wick arranged adjacent the chamber, a pair of telescopic elements between the chamber and wick, said elements being hollow so as to conduct the air and gasolene to the chamber, and means to adjust said elements whereby the same may control the amount of air and gasolene that enters the chamber.

In testimony whereof I have signed my name to this specification in the presence of two subscribing witnesses.

LESTER G. POND.

Witnesses:
ADA E. HAGERTY,
J. A. MILLER.

---

Copies of this patent may be obtained for five cents each, by addressing the "Commissioner of Patents, Washington, D. C."